United States Patent
Asghar et al.

(10) Patent No.: US 11,201,859 B2
(45) Date of Patent: Dec. 14, 2021

(54) TENANT-SPECIFIC ENCRYPTION OF PACKETS CARRIED IN MULTI-CLOUD NETWORKS

(71) Applicant: Cisco Technology, Inc., San Jose, CA (US)

(72) Inventors: Javed Asghar, Dublin, CA (US); Sridhar Vallepalli, Fremont, CA (US); Govind Prasad Sharma, Union City, CA (US); Eshwar Rao Yedavalli, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 16/163,453

(22) Filed: Oct. 17, 2018

(65) Prior Publication Data

US 2020/0127983 A1 Apr. 23, 2020

(51) Int. Cl.
*H04L 29/06* (2006.01)
*H04L 9/08* (2006.01)
*H04L 9/14* (2006.01)

(52) U.S. Cl.
CPC ........ *H04L 63/0485* (2013.01); *H04L 9/0819* (2013.01); *H04L 9/14* (2013.01); *H04L 63/0414* (2013.01)

(58) Field of Classification Search
CPC ............. H04L 63/0485; H04L 63/0428; H04L 12/4641; H04L 9/0819; H04L 63/0272;
(Continued)

(56) References Cited

U.S. PATENT DOCUMENTS 9,742,626 B2 8/2017 Ramachandran et al.
2015/0381590 A1* 12/2015 Bosko ................. H04L 63/0428
713/171
(Continued)

OTHER PUBLICATIONS

Venkataramana et al., "Multi-Tenant Data Storage Security In Cloud Using Data Partition Encryption Technique", Intern. Journal Scientific & Engineering Research, vol. 4, Iss. 7, Jul. 2013, 5pgs.
(Continued)

*Primary Examiner* — Daniel B Potratz
*Assistant Examiner* — Wansik You
(74) *Attorney, Agent, or Firm* — Lee & Hayes, P.C.

(57) ABSTRACT

A method and apparatus for providing tenant specific encryption is described herein. According to an embodiment, a transmission site receives a data packet for transmission or forwarding. The transmission site determines, based on information in a header of the data packet, that the data packet is to be encrypted before transmission or forwarding. Using the information in the header, the transmission site identifies an encryption key for the data packet. The transmission site generates, for the data packet, an additional header and populates the additional header with a destination port number based on a destination port header value of the data packet. The transmission site overwrites the destination port header value of the packet with data indicating that the data packet is encrypted and then encrypts an encapsulated packet within the data packet using the encryption key prior to transmitting or forwarding the data packet. Upon receipt, the destination port header is used by the receiving site to determine that the packet is encrypted.

19 Claims, 4 Drawing Sheets

(58) Field of Classification Search
CPC ..... H04L 63/166; H04L 9/14; H04L 63/0414; H04L 69/22
See application file for complete search history.

(56) References Cited

U.S. PATENT DOCUMENTS

| | | |
|---|---|---|
| 2017/0026417 A1 | 1/2017 | Ermagan et al. |
| 2017/0034129 A1 | 2/2017 | Sawant et al. |
| 2017/0085502 A1 | 3/2017 | Biruduraju |
| 2018/0034792 A1* | 2/2018 | Gupta ................... G06F 21/602 |
| 2018/0115548 A1* | 4/2018 | Edsall ................. H04L 63/0876 |
| 2018/0159856 A1* | 6/2018 | Gujarathi ................ H04L 67/10 |

OTHER PUBLICATIONS

Mahalingam, et., al., "Independent Submission: Virtual Extensible Local Area Network (VXLAN): A Framework for Overlaying Virtualized Layer 2 Networks over Layer 3 Networks", retreived from <<https://tools.ietf.org/pdf/rfc7348.pdf>> on Sep. 29, 2017, published Aug. 2014, 22 pages.

PCT Seart Report and Written Opinion dated Jan. 23, 2020, for PCT Application No. PCT/US2019/056143, 11 pages.

* cited by examiner

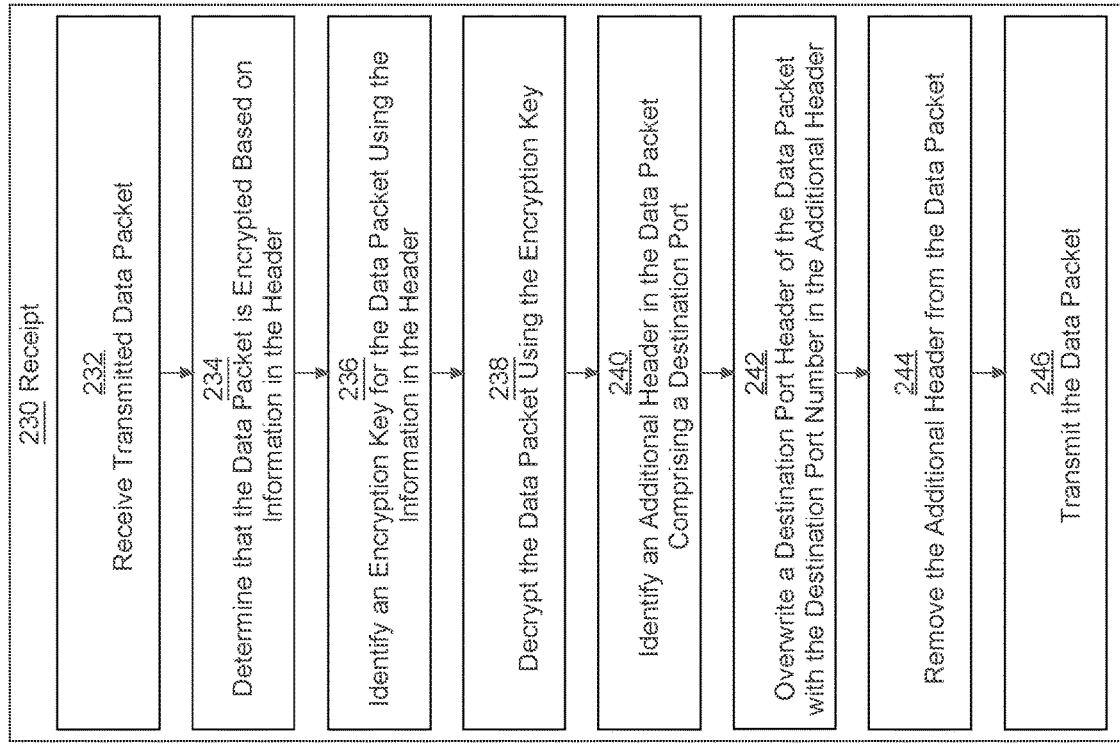
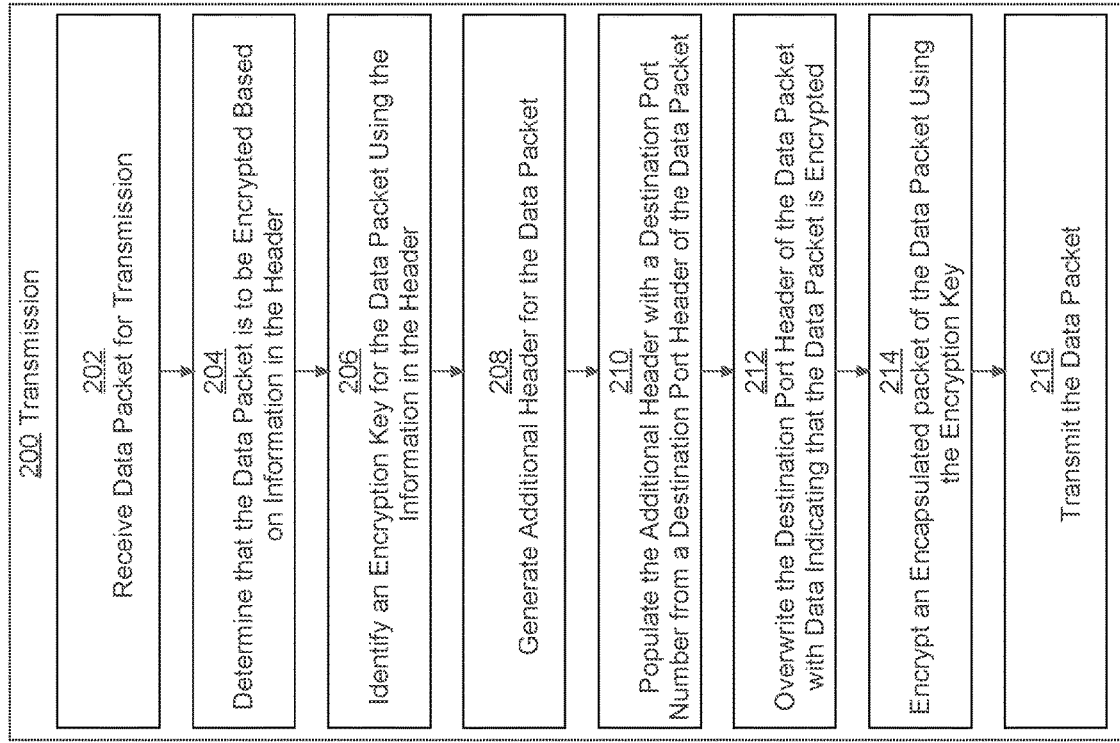
FIG. 2

TENANT-SPECIFIC ENCRYPTION OF PACKETS CARRIED IN MULTI-CLOUD NETWORKS

FIELD OF THE DISCLOSURE

One technical field of the present disclosure is encryption and decryption of digitized information carried in telecommunications networks. Another technical field is management of network traffic for multiple different tenants of networks that use multiple cloud-based datacenters to ensure privacy of traffic of different tenants.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software-defined networking (SDN) techniques offer many benefits in deploying hardware, software and services in data centers or cloud computing facilities. Enterprises commonly deploy services and applications using multi-cloud networks in which services or applications are installed in multiple different cloud service providers. In some instances, enterprise networks are communicatively coupled to other networks of public cloud service providers using Virtual Extensible Local Area Network (VXLAN) tunnels arranged in a full mesh and orchestrated by a multi-site controller node or computer. VXLAN is an encapsulation protocol for running an overlay network on existing Layer 3 infrastructure. An overlay network is a virtual network that is built on top of existing network Layer 2 and Layer 3 technologies to support elastic compute architectures.

Such VXLAN tunnels can be encrypted so that network traffic passing from site to site is protected. Typically, encryption is applied to all network traffic communicated from one site to another. When multiple different enterprises are using the same cloud service providers, the result is that network traffic carrying private data of different enterprises is aggregated and encrypted together. The different enterprises or "tenants" of the system may be associated with different virtual router forwarding (VRF) tables in physical routers that forward traffic. Unfortunately, this approach is unacceptable when different enterprises have different security profiles and require different levels of encryption.

For example, assume that Tenant-VRF-A has a high security profile, Tenant-VRF-B has a medium security profile and Tenant-VRF-C tolerates cleartext transmission of packets. Present technology has not provided a way to apply different encryption capability to each tenant's traffic. Some form of solution is needed to permit secure deployment of per-tenant encryption in a multi-cloud environment.

SUMMARY

The appended claims may serve as a summary of the invention.

BRIEF DESCRIPTION OF THE DRAWINGS

In the drawings:

FIG. 2 depicts an example method for implementing a tenant-based encryption scheme.

DETAILED DESCRIPTION

Figure 1:
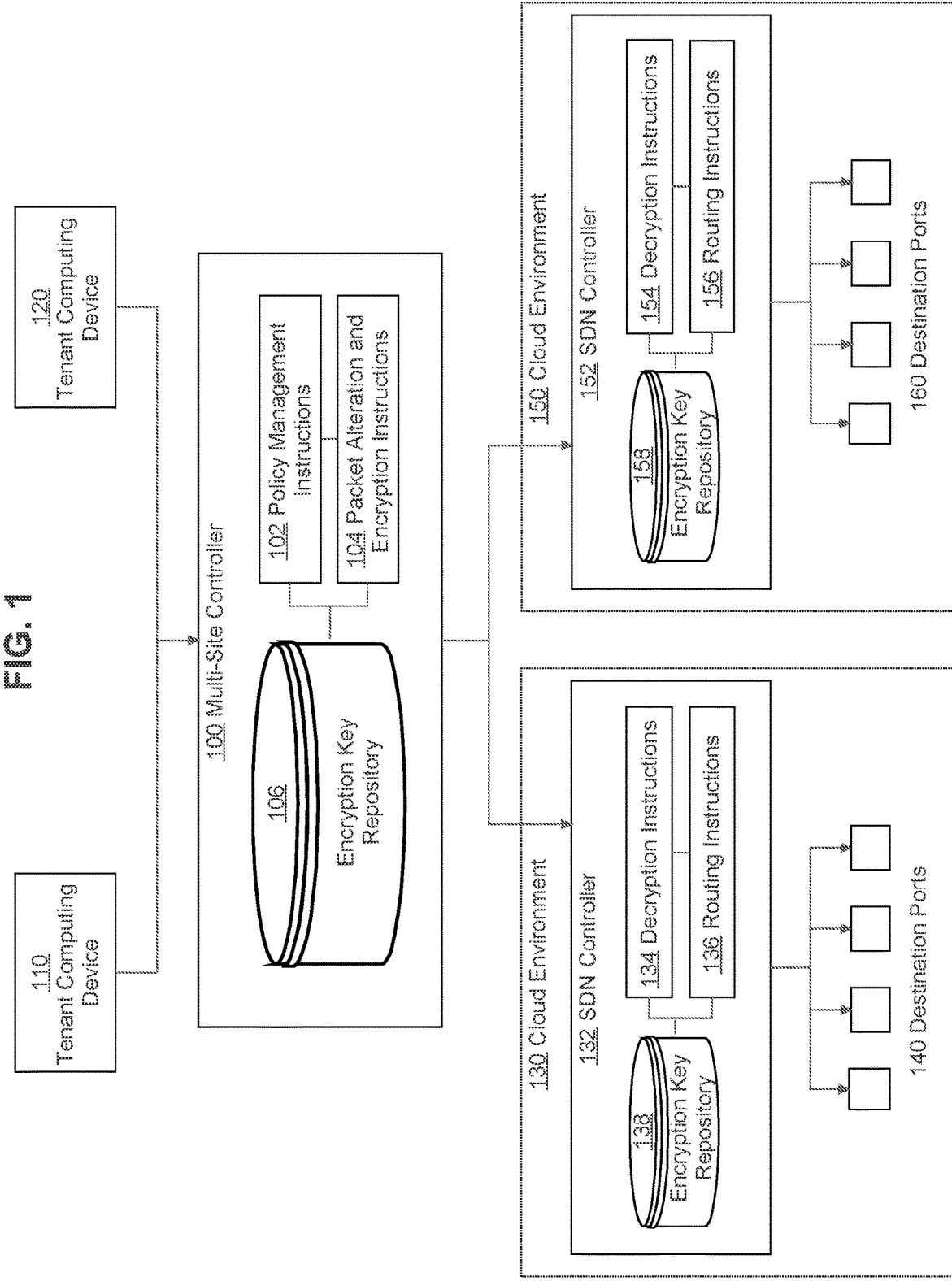
FIG. 1 depicts a schematic diagram of a cloud network for implementing a tenant-based encryption scheme.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In an embodiment, site-to-site transmission of tenant packet traffic is improved in three principal ways. First, VXLAN headers are transmitted in the clear without encryption. Next, per-tenant or VRF-level encryption is applied using VXLAN overlay packets; tenant-EPG level encryption is also possible. Finally, counter values and analytics data is created and maintained by a multi-site controller, for all data transmitted to or received by a tenant, permitting generation of reports or statistics on a per-tenant basis as an added service for multi-cloud enterprise users.

The system is able to perform tenant-EPG level encryption by storing an encryption key data repository which associates encryption keys with header information for a data packet. When a data packet is received, the system searches the encryption key data repository for matching header information. If no matching information is found, the packet is transmitted without being encrypted. If matching information is found in the encryption key data repository, a corresponding encryption key is used to encrypt the data packet, the destination port number is copied into an additional header which is inserted into the data packet, and the destination port header is overwritten with data indicating that the packet is encrypted.

When a receiving site receives data packets, the receiving site checks the destination port header in order to route the packet. If the destination port header includes a destination port number, the packet is routed to the corresponding destination port. If the destination port header includes the information indicating that the packet is decrypted, the receiving site uses the header information of the packet to search for an encryption key in an encryption key data repository. The receiving site then decrypts the packet using the encryption key, copies the destination port number back into the destination port header, removes the additional header, and then routes the packet to a destination port.

In an embodiment, a method comprises receiving a data packet for transmission or forwarding; determining, based on information in a header of the data packet, that the data packet is to be encrypted before transmission or forwarding; using the information in the header, identifying an encryption key for the data packet; generating, for the data packet, an additional header; populating the additional header with a destination port number based on a destination port header value of the data packet; overwriting the destination port header value of the packet with data indicating that the data packet is encrypted; encrypting an encapsulated packet within the data packet using the encryption key; transmitting or forwarding the data packet.

In an embodiment, a method comprises receiving a transmitted data packet; determining, based on information in a header of a data packet, that the data packet is encrypted; using the information in the header, identifying an encryption key for the data packet; decrypting the data packet using the encryption key; identifying an additional header in the data packet comprising a destination port number; overwriting a destination port header of the data packet with the destination port number in the additional header; removing the additional header from the data packet.

2. Structural and Functional Examples

2.1 Terminology for Certain Embodiments

For some embodiments, the following terminology may have the following meanings.

CloudSec may refer to distributed software or instructions sets that collectively provide data security and data integrity for network traffic that is communicated between one datacenter, or datacenter site, and another datacenter or datacenter site. In one embodiment, CloudSec uses MACSec, as defined by the IEEE, for security of UDP packets, including VXLAN packets. In some embodiments, an encrypting device inserts a CloudSec header into packets; the header carries metadata such as packet encryption parameters and a decrypting device uses the header to decrypt the packet.

A Site SDN Controller is a computer or process that implements software-defined networking (SDN) and is programmed for managing policies and monitoring the operations of the datacenter internetworking fabric of a particular datacenter site, usually including all routers and switches within the site. In some embodiments, a Site SDN Controller will have been previously deployed in a site for purposes not specifically related to this disclosure.

A Multisite Controller or MSC is a SDN controller that is programmed to interconnect multiple different Site SDN Controllers in a management plane, and to manage and monitor inter-site policies and operations. In some embodiments, a Multisite Controller will have been previously deployed in a site for purposes not specifically related to this disclosure.

2.2 Multi-Cloud Environment

FIG. 1 depicts a schematic diagram of a cloud network for implementing a tenant-based encryption scheme.

FIG. 1 includes a multi-site controller 100, tenant computing devices 110 and 120, and cloud environments 130 and 150. The cloud environments 130 and 150 comprise SDN controllers 132 and 152 respectively and destination ports 140 and 160 respectively. In an embodiment, the various elements of FIG. 1 are communicatively coupled over one or more networks. The one or more networks broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth.

The multi-site controller 100, tenant computing devices 110 and 120, SDN controllers 132 and 152, and other elements of the system may each comprise an interface compatible with the network and are programmed or configured to use standardized protocols for communication across the networks such as TCP/IP, and higher-layer protocols such as HTTP, TLS, and the like.

Multi-site controller 100 comprises a system that manages flows between cloud networks. The multi-site controller 100 may be configured to monitor and manage policies between different cloud environments. Multi-site controller 100 may be implemented using a server-class computer or other computers having one or more processor cores, co-processors, or other computers. Multi-site controller 100 may be a physical server computer and/or a virtual server instance stored in a data center, such as through cloud computing. Additionally or alternatively, multi-site controller 100 may be an application executing on a server computer system which comprises an encryption key repository 106 and instructions for policy management, packet alteration, and packet encryption.

Encryption key repository 106 comprises a data repository storing encryption keys for one or more tenants. Encryption keys may be stored with data identifying tenants to which the encryption key corresponds and/or one or more methods of identifying the tenant based on data in a received packet. For example, a row of a data table may include an encryption key, an identifier of a tenant, and one or more values from a data packet that indicate the encryption key is to be used. The one or more values may include any of an outer destination internet protocol (oDIP) address, an L4 destination port, a virtual extensible local area network identifier (vnid), or other data from a header of a data packet.

Policy management instructions 102 comprise computer readable instructions which, when executed by the multi-site controller 100, cause the multi-site controller 100 to manage policies relating to different tenants. For example, policy management instructions 102 may include instructions for specifying security levels for different tenants. Packet alteration and encryption instructions 104 comprise computer readable instructions which, when executed by the multi-site controller 100, cause the multi-site controller 100 to alter data packets using the techniques described herein and encrypt data packets using the encryption keys stored in encryption key repository 106 using the methods described herein.

Computer executable instructions described herein may be in machine executable code in the instruction set of a CPU and may have been compiled based upon source code written in JAVA, C, C++, Python, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the systems described herein.

Tenant computing devices 110 and 120 comprise computing devices which are configured to communicate with computing devices in cloud environments 130 and 150 through multi-site controller 100. Each of tenant computing devices 110 and 120 may comprise computing devices associated with separate tenants. For example, tenant computing device 110 may comprise a computing device that sends data on behalf of a first organization while tenant computing device 120 comprises a computing device that sends data on behalf of a second organization.

Data sent from tenant computing devices 110 and 120 is sent as data packets to destination ports in cloud environment 130 and/or cloud environment 150. Cloud environments 130 and 150 comprise separate cloud environments, each comprising an SDN controller for managing policies and monitoring operations of the individual cloud environments and a plurality of destination ports. Destination ports 140 and 160 comprise virtual locations within a cloud data environment.

SDN controllers 132 and 152 comprise systems that manage flows between switches and routers. The SDN controllers 132 and 152 may communicate with networked devices using application programming interfaces (API). The SDN controllers 132 and 152 may perform a variety of network tasks, such as identifying which devices are in the network, the capabilities of the devices, gathering network statistics, and/or executing rules to determine optimal allocation of resources throughout the network. The SDN controllers 132 and 152 may be further programmed or configured to decrypt data packets using encryption keys stored in encryption key repositories 138 and 158 respectively.

SDN controllers 132 and 152 comprise decryption instructions 134 and 154 and routing instructions 136 and 156 respectively. Decrypting instructions 134 and 154 comprise computer readable instructions which, when executed by SDN controllers 132 and 152 respectively, cause the SDN controllers to identify data packets for decryption and decrypt the identified data packets. Routing instructions 136 and 156 comprise computer readable instructions which, when executed by SDN controllers 132 and 152 respectively, cause the SDN controllers to route data packets to destination ports 140 and 160 respectively.

3. Tenant-Based Encryption

FIG. 2 depicts an example method for implementing a tenant-based encryption scheme. FIG. 2 includes an example method for encrypting a data packet prior to transmission 200 and an example method for decrypting the data packet upon receipt 230.

3.1 Transmission

At step 202, a data packet is received for transmission or forwarding. For example, the multi-site controller 100 may receive data packets for transmission from one or more of tenant computing device 110 or tenant computing device 120.

At step 204, the system determines that the data packet is to be encrypted based on information in the header. The header information may include any of a virtual extensible LAN (VxLAN) identifier (vnid), an outer destination internet protocol address (oDIP) and/or an L4 destination port. The system may compare the header information with stored information to determine whether to encrypt the data packet. For example, the multi-site controller may store an encryption key repository which identifies a plurality of vnids, oDIPs, and/or L4 destination ports. If the vnid, oDIP and/or L4 destination port is identified in the encryption key repository, the system may determine that the packet is to be encrypted. If the vnid, oDIP and/or L4 destination port is not identified in the encryption key repository, the system may forward the packet to the appropriate destination without altering or decrypting the packet.

At step 206, an encryption key for the data packet is identified using the information in the header. For example, the multi-site controller 100 may search the encryption key repository in step 204 for items that match the information in the header of the data packet, such as a matching vnid, oDIP, and/or L4 destination port. The multi-site controller may identify an encryption key stored in an entry that identifies the matching information from the header. For example, if a row of a data table includes the encryption key and a matching oDIP, the multi-site controller may identify the row through a search of the oDIP column for the matching oDIP and extract the encryption key from the identified row.

At step 208, an additional header is generated for the data packet. For example, the multi-site controller may generate a CloudSec header for the data packet. The CloudSec header may be configured to contain data describing packet encryption details that can be used by a decrypting device to decrypt the packet. The CloudSec header may be additionally configured to include data describing a destination port for the data packet. In an embodiment, the CloudSec header is inserted into a VxLAN packet after a UDP header and prior to a VxLAN header of the VxLAN packet.

At step 210, the additional header is populated with a destination port number from a destination port header of the data packet. For example, the system may identify a destination port header in the data packet, such as a UDP header in a VxLAN packet which specifies an L4 destination port for the data packet. The system may copy the destination port information from the destination port header into the CloudSec header for future use, thereby allowing the destination port header to be overwritten.

At step 212, the destination port header of the data packet is overwritten with data indicating that the data packet is encrypted. As the destination port number has been copied into the CloudSec header, the system is able to remove the destination port number from the destination port header of the data packet and replace the destination port number with data indicating that the packet is encrypted. For example, the system may replace the destination port number in the destination port header with a CloudSec identifier, thereby indicating that the data packet is a CloudSec data packet. In an embodiment, in response to overwriting the destination port header, the system updates a destination port header length field to reflect a changed number of bytes in the destination port header.

At step 214, an encapsulated packet within the data packet is encrypted using the encryption key. The encapsulated packet, as used herein, refers to the data in the data packet that is being transmitted, excluding the header information and any integrity check (IC) or cyclic redundancy check (CRC) values. Thus, the system may identify the encapsulated packet as the data following the packet's header but prior to the IC or CRC values. For example, the header of the data packet may include information identifying a size of the header and/or a size of the encapsulated packet. The system may use the header size as an offset for beginning encryption of the packet. Thus, if data in the header identifies the header size as 60 bytes, the system may begin encrypting the data packet using the identified encryption key after the first 60 bytes of the data packet.

If the header additionally includes the size of the encapsulated packet, the system may use the size to determine when to stop encrypting the data packet. As an example, if the encapsulated packet is 500 bytes, the system may encrypt the first 500 bytes of the data packet after the header.

In an embodiment, the system generates an integrity check value header and inserts the integrity check value header after the encrypted payload of the data packet. The system may compute an integrity check value using one or more integrity processes, such as a 32-bit cyclic redundancy check checksum function. The integrity check value may cover the encrypted payload as well as at least a portion of the header information, such as a VxLAN Header, a CloudSec Header, a UDP Header, and an IP Header. Additionally, if the packet comprises a CRC value, the system may recalculate the CRC after the integrity check value has been inserted.

At step 216, the data packet is transmitted. For example, the multi-site controller may transmit the data packet to one or more cloud destinations, such as a site-specific SDN in a cloud environment, for decryption. While the system is described in terms of a multi-site controller and a site-specific SDN, the system described herein may be usable with any configuration system where encryption is used between two networked sites before being transmitted to a final destination. Thus, as long as the system is configured to generally transmit data packets from a transmission site to a receiving site, the system may perform the packet encryption process described in FIG. 2 at the transmission site.

Figure 3:
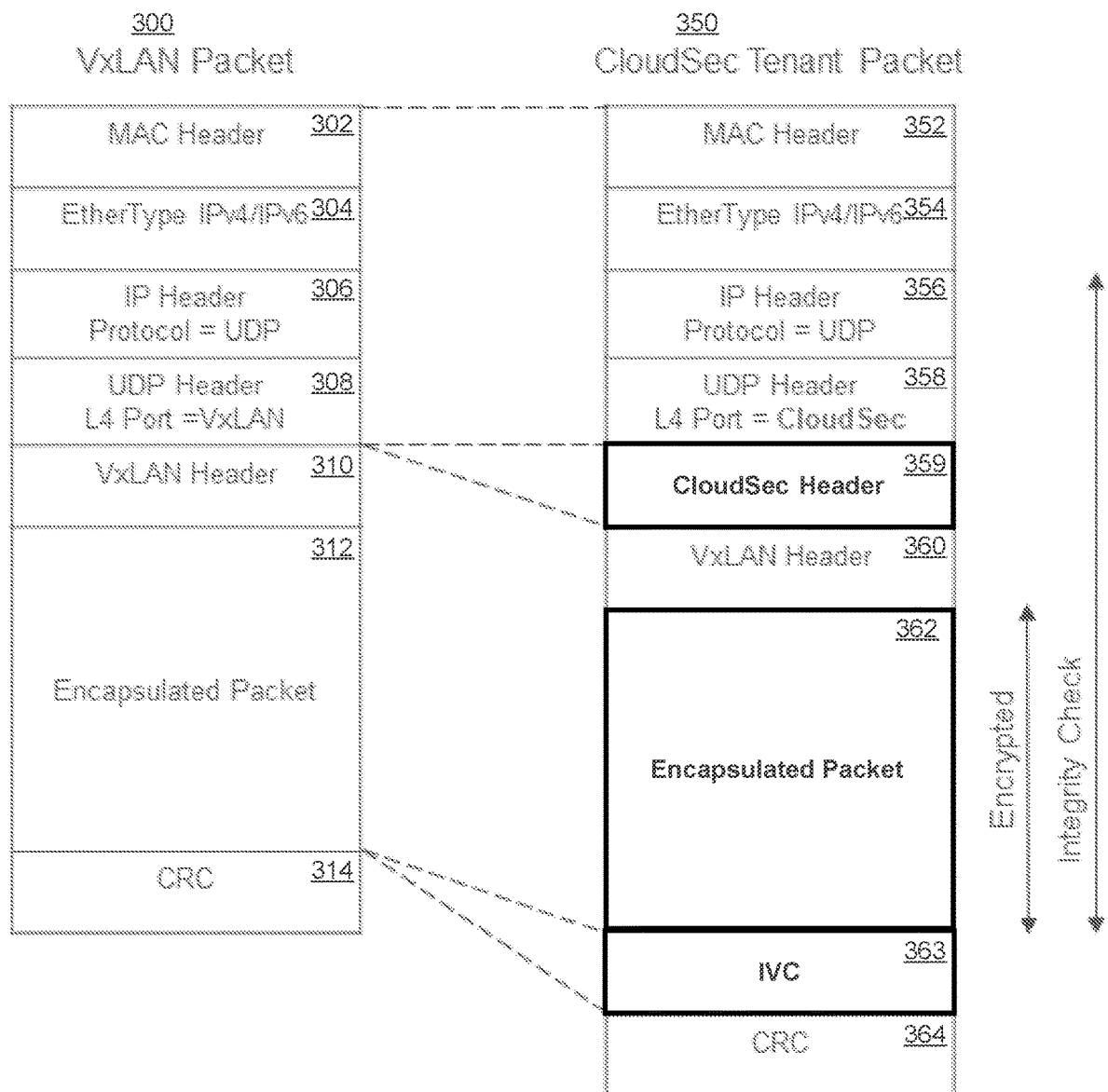
FIG. 3 depicts an example data packet that is modified using a tenant-based encryption scheme.

FIG. 3 depicts an example data packet that is modified using a tenant-based encryption scheme. FIG. 3 includes a received VxLAN packet 300 and an altered CloudSec tenant packet 350. While the example of FIG. 3 depicts the encryption scheme described herein being applied to a VxLAN packet, the techniques described herein may be applied to any type of data packet which includes a destination port header.

The VxLAN packet 300 includes a media access control (MAC) header 302, an ethernet type 304, an internet protocol (IP) header 306, a UDP header 308, a VxLAN header 310, an encapsulated packet 312, and a CRC value 314. The MAC header 302 identifies a network access method for the VxLAN packet 300. The ethernet type 304 specifies the internet protocol encapsulated in the payload of the packet. The IP header 306 contains information about the IP version and source IP address. The UDP header 308 specifies a destination port for the VxLAN packet 300. The VxLAN header 310 includes the vnid for the VxLAN packet 300. The encapsulated packet 312 comprises the payload of the VxLAN packet 300. The CRC value 314 comprises an error-detecting code used to detect changes to raw data in the packet.

In an embodiment, the system transforms the VxLAN packet 300 into a CloudSec tenant packet 350. The CloudSec tenant packet 350 comprises MAC header 352, ethernet type 354, and IP header 356 which correspond to MAC header 302, ethernet type 304, and IP header 306 respectively. The system inserts the CloudSec header 359 into the data packet after the UDP header 358 and before the VxLAN header 360. The system copies the destination port into CloudSec header 359 and overwrites the destination port in UDP header 358 with data indicating that the data packet is CloudSec data packet.

The encapsulated packet 362 is encrypted using an encryption key identified using the methods described herein. An integrity check value 363 is inserted into the data packet after the encrypted encapsulated packet. The integrity check value 363 covers all the data between the IP header 356 and the end of the encapsulated packet 362. The CRC value 364 is recalculated after the above described modifications are completed.

3.2 Receipt

In an embodiment, a plurality of transmitted packets is sent to a receiving site. The transmitted packets may include packets that have been encrypted using the methods described herein as well as data packets that have not been encrypted. For example, the transmission site may send both the encrypted data packets and unencrypted data packets to the same receiving site.

Referring again to FIG. 2, at step 232 a transmitted data packet is received. For example, a site-specific SDN controller of a cloud environment may receive a plurality of data packets from a multi-site controller.

At step 234, the system determines that the data packet is encrypted based on information in the header. For example, the receiving site may be configured to identify a value in the destination header of the packet. If the value in the destination header of the packet is a destination port number, the receiving site may determine that the data packet has not been encrypted and route the data packet to the correct destination port. If the value in the destination header is data indicating that the data packet is encrypted, such as the CloudSec identifier in UDP header 358 of FIG. 3, the system may determine that the data packet is encrypted.

At step 236, an encryption key for the data packet is identified using the information in the header. For example, the SDN controller may store a key repository comprising a plurality of encryption keys, each of which corresponding to tenant specific information such as a vnid, oDIP, and/or L4 destination port. The SDN controller may search the key repository for an encryption key corresponding to data that matches the header information of the data packet, such as the vnid of the data packet. As the header information is not encrypted in the data packet, the header information is capable of being used to look up the encryption key for the data packet.

In an embodiment, the additional header comprises information identifying one of a plurality of keys corresponding to the header information for decrypting the data packet. For example, a specific tenant may use a plurality of encryption keys for encrypting data packets. When the additional header is generated, an association number field in the additional header may be used to identify which of a plurality of encryption keys for a specific tenant to use to encrypt the data packet. When the data packet is received, the additional header information may be used again to identify which encryption key to use to decrypt the data packet.

At step 238, the data packet is decrypted using the encryption key. For example, the SDN controller may use the identified encryption key to decrypt the encapsulated packet. After the data packet has been decrypted, the system may check the integrity check value to determine if the data in the packet has been altered in transit. If the integrity check value passes, the system proceeds to step 240. If the integrity check value fails, the system may drop the packet and increment a value indicating a number of dropped packets due to failed integrity checks.

At step 240, an additional header in the data packet comprising a destination port number is identified. For example, in response to determining that the packet is encrypted, the system may identify the additional header that has been added into the packet. For instance, if the transmission site is configured to add the additional header after the destination port header, the receiving site may be configured to search for the additional header after the destination port header. The receiving site may be further configured to identify, in the additional header, the destination port number that was copied into the additional header in step 210.

At step 242, a destination port header of the data packet is overwritten with the destination port number in the additional header. For example, the SDN controller may replace the data identifying the data packet as being encrypted with the destination port number identified in the additional header. Thus, the destination port header can be used to either route the received data packets or determine that the received data packets are encrypted. After the encrypted data packets are decrypted, the destination port header is restored using the destination port number stored in the additional header and the restored destination port header is used to route the decrypted data packets.

At step 244, the additional header is removed from the data packet. For example, the SDN controller may remove the additional header from the data packet after the data packet has been decrypted and the destination port header has been restored. The system may also remove the integrity check value from the data packet after ensuring that the integrity check value passes. In an embodiment, the SDN controller additionally updates the CRC value for the data packet after the additional header and/or the integrity check value have been removed from the data packet.

At step 246, the data packet is transmitted. For example, after the packet has been decrypted and the extra fields have been removed, the SDN controller may route the data packet to the correct destination port using the destination port number in the destination port header.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
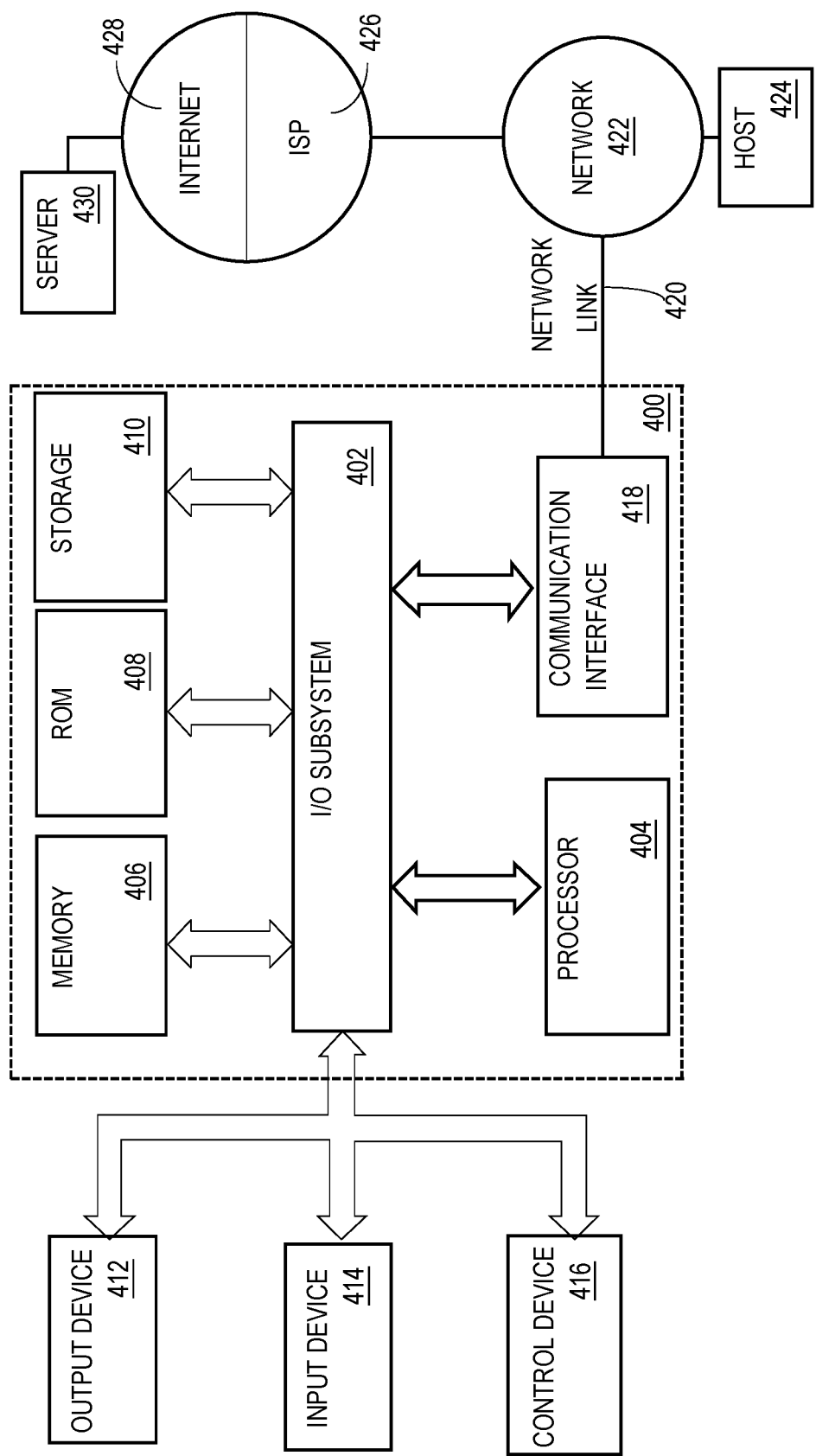
FIG. 4 is a block diagram that illustrates an example computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, inter-network or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method performed by a multi-site controller managing data flows between multiple cloud environments, the method comprising:

receiving, from a tenant computing device outside of the cloud environments, a first data packet comprising a destination port number associated with a destination port in a particular cloud environment among the cloud environments;
identifying, based on information in a header of the first data packet, a first tenant associated with the first data packet;
identifying, in a data repository, a first tenant-specific encryption key associated with the first tenant and a first level of encryption, the data repository storing a second tenant-specific encryption key associated with a second tenant and a second level of encryption, the second level of encryption being different than the first level of encryption;
generating an additional header of the first data packet;
populating the additional header with a destination port number based on a destination port header value of the first data packet;
overwriting the destination port header value of the first data packet with data indicating that the first data packet is encrypted;
encrypting an encapsulated packet within the first data packet using the first tenant-specific encryption key;
transmitting the first data packet to the particular cloud environment.
receiving, from another tenant computing device outside of the cloud environments, a second data packet;
identifying, based on information in a header of the second data packet, a third tenant associated with the second data packet;
determining that the data repository lacks a tenant-specific encryption key associated with the third tenant; and
based on determining that the data repository lacks the tenant-specific encryption key associated with the third tenant, transmitting the second data packet to the particular cloud environment without performing encryption on the second data packet or a different cloud environment without performing encryption on the second data packet.

2. The method of claim 1, further comprising inserting the additional header after the destination port header and prior to a virtual extensible local area network (VxLAN) header.

3. The method of claim 1, further comprising updating a length field of the destination port header of the first data packet to reflect a number of bytes that are added as part of overwriting the destination port header.

4. The method of claim 1, further comprising inserting in the first data packet, after the encrypted encapsulated packet, an integrity check value associated with an internet protocol (IP) header, the destination port header, the additional header, and the encapsulated packet.

5. The method of claim 1, further comprising:
storing, in the data repository, a plurality of encryption keys and data associating each encryption key with a tenant identifier, the plurality of encryption keys comprising the first tenant-specific encryption key and the second tenant-specific encryption key;
wherein identifying the first tenant-specific encryption key associated with the first tenant comprises using the information in the header to search the data repository for the first tenant-specific encryption key associated with the tenant identifier of the first data packet.

6. The method of claim 5, wherein the tenant identifier comprises one or more of a packet outer destination internet protocol (IP) address or a packet VxLAN identification number that is stored in the header.

7. The method of claim 5, wherein searching the data repository for the first tenant-specific encryption key associated with the tenant identifier of the first data packet comprises:
identifying, in the data repository, a first candidate encryption key associated with the first tenant and a first association number;
identifying, in the data repository, a second candidate encryption key associated with the first tenant and a second association number;
selecting the first candidate encryption key as the first tenant-specific encryption key, and
wherein the method further comprises:
populating the additional header with the first association number.

8. A method performed by a controller in a cloud environment, the method comprising:
receiving a first data packet from a multi-site controller that is outside of the cloud environment;
determining, based on information in a header of the first data packet, that the first data packet is encrypted;
identifying, based on the information in the header of the first data packet, a first tenant associated with the first data packet;
identifying, in a data repository, a first tenant-specific encryption key associated with the first tenant and a first level of encryption, the data repository storing a second tenant-specific encryption key associated with a second tenant and a second level of encryption, the second level of encryption being different than the first level of encryption;
decrypting the first data packet using the first tenant-specific encryption key;
identifying an additional header in the first data packet comprising a destination port number;
overwriting a destination port header of the first data packet with the destination port number in the additional header;
removing the additional header from the first data packet;
forwarding the first data packet to a destination port in the cloud environment, the destination port corresponding to the destination port number;
receiving, from a tenant computing device outside of the cloud environments, a second data packet;
identifying, based on information in a header of the second data packet, a third tenant associated with the second data packet;
determining that the data repository lacks a tenant-specific encryption key associated with the third tenant; and
based on determining that the data repository lacks the tenant-specific encryption key associated with the third tenant, transmitting the second data packet to the particular cloud environment without performing encryption on the second data packet or a different cloud environment without performing encryption on the second data packet.

9. The method of claim 8, wherein the additional header is a header of the first data packet that was inserted after the destination port header and prior to a VxLAN header.

10. The method of claim 8, further comprising:
determining if an integrity check value of the first data packet is valid after decryption of the first data packet;
in response to determining that the integrity check value is valid, transmitting the first data packet to a destination port identified by the destination port number.

11. The method of claim 8, further comprising:
determining that an integrity check value of the first data packet is invalid;
in response to determining that the integrity check value is invalid, dropping the first data packet and incrementing a dropped data packet value.

12. The method of claim 8, further comprising:
storing, in the data repository, a plurality of encryption keys associated with tenant identifiers, the plurality of encryption keys comprising the first tenant-specific encryption key and the second tenant-specific encryption key;
wherein identifying the first tenant-specific encryption key associated with the first tenant comprises using the information in the header to search the data repository for the first tenant-specific encryption key associated with a tenant identifier of the first data packet.

13. The method of claim 12, wherein the tenant identifier comprises one or more of a packet outer destination internet protocol (IP) address or a packet VxLAN identification number that is stored in the header.

14. The method of claim 8, wherein determining that the first data packet is encrypted comprises identifying data in the destination port header indicating that the first data packet is encrypted.

15. A system, comprising:
one or more processors;
a memory storing instructions which, when executed by the one or more processors, cause the one or more processors to perform operations comprising:
storing, in a data repository, a plurality of encryption keys and data associating each encryption key with a tenant identifier, the plurality of encryption keys comprising the tenant-specific encryption key;
receiving, from a tenant computing device outside of cloud environments, a first data packet addressed to a destination in a particular cloud environment among the cloud environments;
identifying, based on information in a header of the first data packet, a first tenant associated with the first data packet;
identifying, in the data repository, a first tenant-specific encryption key associated with the first tenant;
generating an additional header of the first data packet;
overwriting a header value of the first data packet with data indicating that the first data packet is encrypted;
encrypting an encapsulated packet within the first data packet using the first tenant-specific encryption key;
transmitting the first data packet to the particular cloud environment;
receiving, from another tenant computing device outside of the cloud environments, a second data packet;
identifying, based on information in a header of the second data packet, a second tenant associated with the second data packet;
determining that the data repository lacks a second tenant-specific encryption key associated with the second tenant; and
based on determining that the data repository lacks the tenant-specific encryption key associated with the second tenant, transmitting the second data packet to the particular cloud environment without performing encryption on the second data packet or to a different cloud environment without performing encryption on the second data packet.

16. The system of claim 15, wherein the operations further comprise inserting the additional header in the first data packet after a destination port header and prior to a virtual extensible local area network (VxLAN) header.

17. The system of claim 15, wherein overwriting the header value of the first data packet with data indicating that the first data packet is encrypted comprises overwriting a destination port header value of the first data packet with the data indicating that the first data packet is encrypted, and
wherein the operations further comprise updating a length field of the destination port header of the first data packet to reflect a number of bytes that are added as part of overwriting the destination port header.

18. The system of claim 15,
wherein the tenant identifier comprises one or more of a packet outer destination internet protocol address or a packet VxLAN identification number that is stored in the header.

19. The system of claim 15, wherein the data repository further stores a third tenant-specific encryption key associated with a third tenant, and
wherein the first tenant-specific encryption key is associated with a first encryption level and the third tenant-specific encryption key is associated with a second encryption level.

* * * * *